US012215689B2

(12) United States Patent
Linnemann Nielsen

(10) Patent No.: US 12,215,689 B2
(45) Date of Patent: Feb. 4, 2025

(54) ECCENTRIC SCREW PUMP WITH A PRESSURE CHAMBER BETWEEN AN ELASTOMERIC STATOR PORTION AND A CASING

(71) Applicant: GRUNDFOS HOLDING A/S, Bjerringbro (DK)

(72) Inventor: Niels Erik Linnemann Nielsen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 17/778,262

(22) PCT Filed: Nov. 19, 2020

(86) PCT No.: PCT/EP2020/082750

§ 371 (c)(1),
(2) Date: May 19, 2022

(87) PCT Pub. No.: WO2021/099502

PCT Pub. Date: May 27, 2021

(65) Prior Publication Data

US 2022/0389926 A1 Dec. 8, 2022

(30) Foreign Application Priority Data

Nov. 22, 2019 (EP) .................................... 19210909

(51) Int. Cl.

*F04C 2/107* (2006.01)
*F04C 14/06* (2006.01)
*F04C 15/00* (2006.01)

(52) U.S. Cl.

CPC ............ *F04C 2/1075* (2013.01); *F04C 14/06* (2013.01); *F04C 15/0046* (2013.01);
(Continued)

(58) Field of Classification Search

CPC .... F04C 2/1075; F04C 14/06; F04C 2240/10; F04C 2240/802; F05C 2251/02
See application file for complete search history.

(56) References Cited

U.S. PATENT DOCUMENTS 5,807,087 A * 9/1998 Brandt .................. F04C 2/1075 418/153
6,336,796 B1 * 1/2002 Cholet .................. F04C 2/1075 418/179
(Continued)

FOREIGN PATENT DOCUMENTS

CH 438953 A 6/1967
DE 3119568 A1 12/1982
(Continued)

OTHER PUBLICATIONS

Machine Translation of German Patent Publication DE 10 2009 015024 B3, Inventor: Heizinger, Title: Stator for eccentric spiral pump, has cylindrical stator casing, lining provided in inner side of stator casing and multiple structural elements; Published: Jul. 15, 2010. (Year: 2010).*
(Continued)

*Primary Examiner* — Mary A Davis
(74) *Attorney, Agent, or Firm* — McGlew and Tuttle, P.C.

(57) ABSTRACT

An eccentric screw pump with a rotor (2) and with a rotationally fixed stator (6; 6') surrounding the rotor (2). The rotationally fixed stator includes at least one elastomeric portion, wherein a pressure chamber (16) is arranged on this elastomeric portion of the stator (6; 6') at a side facing away from the rotor (2). The pressure chamber (16) is connected to a pressure region of the eccentric screw pump such that the at least one elastomeric portion of the stator (6; 6') is subjected to a pressure produced by the eccentric screw pump.

20 Claims, 3 Drawing Sheets

(52) U.S. Cl.
CPC .... *F04C 2240/10* (2013.01); *F04C 2240/802* (2013.01); *F05C 2251/02* (2013.01)

(56) References Cited

U.S. PATENT DOCUMENTS

| | | | | |
|---|---|---|---|---|
| 10,113,426 B2 * | 10/2018 | Eisner | .................. | F04C 2/1075 |
| 2019/0145374 A1 * | 5/2019 | Parhar | .................. | F04C 2/1075 418/48 |

FOREIGN PATENT DOCUMENTS

| | | | | | |
|---|---|---|---|---|---|
| DE | 102009015024 | B3 | | 7/2010 | |
| EP | 1308624 | B1 | | 12/2005 | |
| GB | 2338268 | A | * | 12/1999 | ............ F04C 2/1075 |
| WO | 2013178939 | A1 | | 12/2013 | |
| WO | 2018188694 | A1 | | 10/2018 | |

OTHER PUBLICATIONS

Machine Translation and Foreign Chinese Patent Publication for CN 203892183 U; First Inventor: Zhou: Title: A Stator Of Screw Pump And Screw Pump With Pressure Compensating Cavity; Published: Oct. 22, 2014. (Year: 2014).*

Machine Translation of Swedish Patent Publication CH 438953; Inventor: Streicher; Title: Exzenter-Schneckenpumpe; Published: Jun. 30, 1967. (Year: 1967).*

* cited by examiner

ECCENTRIC SCREW PUMP WITH A PRESSURE CHAMBER BETWEEN AN ELASTOMERIC STATOR PORTION AND A CASING

CROSS REFERENCE TO RELATED APPLICATIONS

This application is a United States National Phase Application of International Application PCT/EP2020/082750, filed Nov. 19, 2020, and claims the benefit of priority under 35 U.S.C. § 119 of European Application 19210909.8, filed Nov. 22, 2019, the entire contents of which are incorporated herein by reference.

TECHNICAL FIELD

The invention refers to an eccentric screw pump.

TECHNICAL BACKGROUND

Eccentric screw pumps or Moineau-pumps are for example known from EP 1 308 624 B1 or DE 31 19 568 A1. These pumps consist of a helical rotor and a surrounding stator. The rotor performs a movement inside the stator which is a combination of a rotational movement and a superimposed radial movement. It is known to make the stator from an elastic material and the rotor from a non-elastic material.

Pumps of this type are especially suitable for high pressure and low flow applications making them advantageous for use in more remote locations or in applications relying on solar or wind power as a primary source of power. A disadvantage with this type of pump is the large starting torque required to overcome the frictional forces between the rotor and the stator. This sets a limit to the size of the pump or would necessitate a frequency converter which however would increase the cost of the pump.

SUMMARY

In view of this it is an object of the invention to provide an improved eccentric screw pump having a reduced starting torque.

This object is achieved by an eccentric screw pump having the features according to the invention. Preferred embodiments are known from this disclosure, including the following description, claims and the accompanying drawings.

The eccentric screw pump or Moineau-pump according to the invention comprises a rotor and a surrounding stator. The stator comprises at least one rotationally fixed elastomeric stator portion and preferably is completely made from an elastomeric material. The rotor preferably is made from a material having a lower elasticity and further preferably is made from metal. For adjusting the contact pressure between rotor and stator there is formed a pressure chamber on a radial outer side of said elastomeric stator portion, i.e. on a side facing away from said rotor. This allows to apply a pressure, in particular a fluid pressure to the pressure chamber which effects a radial force between the elastomeric portion of the stator and the rotor inside the stator. The stator and the rotor may have a conical configuration according to which the diameter of the stator and the rotor decreases from one axial end towards the opposite second axial end of the stator. However, according to a preferred embodiment the rotor and the stator have a non-conical configuration with a constant cross section beside the helical grooves on the outside of the rotor and the inner surface of the stator.

Preferably, there is provided a drive device whose connection to the rotor and configuration is such that it effects a rotating movement of the rotor with a superimposed radial movement. This is a conventional motion of the rotor in an eccentric screw pump. The eccentric movement may be achieved by a suitable gear box or a flexibility of the rotor shaft in a radial direction. In such a configuration the rotor may be guided inside the stator when driven by a rotating drive.

According to the invention said pressure chamber is connected to a pressure region of the eccentric screw pump, i.e. to a region of a flow path for the fluid or medium to be pumped having an increased pressure, i.e. a region downwards the suction or inlet side of the pump. This is the region in which the fluid pumped by the pump has an increased pressure, preferably corresponding to or close to the delivery pressure of the pump. The pressure chamber is connected to this pressure region in a manner such that the at least one elastomeric stator portion is subjected to a pressure which is produced by the eccentric screw pump itself. By this configuration an additional pressure supply, in particular a pressurized air supply can be omitted. Furthermore, by this configuration a pressure control device becomes superfluous, since the pressure control is effected automatically by the delivery pressure of the pump. With increasing the delivery pressure or increasing pressure in the pressure region the pressure acting on the at least one elastomeric portion automatically increases. Thus, the contact force between stator and rotor in the region of the elastomeric portion automatically increases with increasing pressure inside the pump. This has the advantage that when starting the pump the pressure acting inside the pressure chamber onto the elastomeric portion is substantially zero so that there is a reduced contact force between the stator and the rotor in the radial direction effecting a reduced friction during starting. Thus, the starting torque is reduced. This for example allows to use a drive motor of smaller size or power which may be advantageous for use with a limited electric power supply. Alternatively, a pump of larger size may be driven by the same motor without increasing the input power of the motor. With increasing pressure in the pressure region, preferably in the delivery region, also the pressure acting inside the pressure chamber on the elastomeric stator portion increases. This effects a higher contact force between the elastomeric portion and the rotor to improve the sealing contact between the rotor and the stator.

The at least one elastomeric stator portion is a portion of the stator comprising at least a portion of the stator helix being in contact with the outer circumference of the rotor. Thus, this portion of the stator by the pressure inside the pressure chamber is pressed against the outer circumference of the rotor, i.e. the outer circumference, i.e. the helical protrusions of the rotor helix.

Preferably, said pressure chamber is connected to a pressure region in the flow path for the fluid pumped by the pump and preferably to a pressure region at the delivery end of the pump, wherein the pressure chamber is connected to said pressure region preferably via at least one pressure channel. This means the pressure channel extends from the pressure region to the pressure chamber such that the pressure in the pressure region is transferred to the inside of the pressure chamber and inside the pressure chamber there is acting a pressure onto the elastomeric stator portion so that a radial force between the stator and the rotor is effected in this region of the stator. The pressure region is a region of the flow path having an increased pressure which is produced by the pump itself. In particular the pressure region is a region with a pressure higher than the pressure inside at least a portion of the stator in the region of the pressure chamber. Thus, a higher pressure inside the stator is transferred to the outside of the elastomeric portion of the stator surrounding a region of lower pressure inside the pump. Preferably it is a region at the delivery end or close to the delivery end of the pump. In this region the fluid pressure corresponds to the delivery pressure of the pump or nearly reaches the delivery pressure. If this pressure is transferred to the pressure chamber, preferably via the at least one pressure channel, inside the pressure chamber there is a pressure preferably higher than the pressure between the elastomeric stator portion and the rotor, i.e. inside a pump chamber between rotor and stator. This ensures a contact force holding the elastomeric stator portion in sealing contact with the outer circumference of the rotor, i.e. of the rotor helix.

According to a preferred embodiment there is provided at least one pressure channel. However, it would also be possible to arrange more than one, i.e. several pressure channels to connect a pressure region in the flow path of the pump to the pressure chamber.

According to a further preferred embodiment the stator is arranged inside a casing or housing and the pressure chamber is formed between this casing and the at least one elastomeric stator portion, wherein the casing preferably has a lower elasticity than the elastomeric stator portion and further preferably is made from metal. For example the casing may be made from steel. By applying the pressure inside the pressure chamber between the surrounding casing and the elastomeric stator portion a force in the radial direction acting on the elastomeric stator portion is produced. To increase this force it is preferred that the casing has a higher stiffness than the elastomeric stator portion, preferably the casing is substantially not deformed by the pressure. This can in particular be achieved by a casing made from metal like steel. The elastomeric stator portion, however, can be deformed by the pressure acting onto the outside of the elastomeric stator portion such that the elastomeric stator portion is pressed against the outer circumference of the rotor, i.e. the rotor helix, to ensure a tight contact between the stator and the rotor in the region of the elastomeric stator portion.

According to a further preferred embodiment the rotor is formed of a material with a lower elasticity than the elastomeric stator portion. In a preferred embodiment the rotor is formed from metal, for example steel or stainless steel.

According to a further possible embodiment the at least one elastomeric stator portion annularly surrounds the rotor and is loaded by the pressure inside the pressure chamber from its outer peripheral side which is away from the rotor. This means the pressure inside the pressure chamber acts onto the outer side of the elastomeric stator portion such that it produces a force radially inwardly. By this the elastomeric stator portion over the entire circumference is pressed onto the outer surface of the rotor helix to ensure a tight contact.

Preferably said pressure chamber is connected to the pressure region via at least one pressure channel comprising valve means positioned and configured to vary the cross section of the pressure channel and preferably to close the pressure channel in at least one operational condition of the pump. In case that more than one pressure channel should be provided such valve means may be arranged inside each pressure channel or only in one or a part of the pressure channels. The valve means may be positioned and configured to close the pressure channel in certain operational conditions or to vary the cross section, for example depending on the pressure. The valve means may be provided by a deformable portion of an elastic material, wherein a deformation preferably may be caused by an increase of pressure. Thus, the valve means may be configured to vary the cross section of the pressure channels dependent on the pressure produced by the pump and transferred to the pressure chamber. In particular it may be possible to reduce the cross section with increasing pressure to avoid an overload of the elastomeric portion by the pressure inside the pressure chamber. Alternatively, the valve means may be configured such that it opens at a certain pressure such that the pressure in said pressure chamber may be reduced for operational conditions with lower pressure or during start of the pump. In an alternative embodiment the valve means may be valve means which are actively controlled by a suitable control means.

According to a further possible embodiment the pressure chamber is connected with the pressure region via at least one pressure channel connected to a pump cavity which is situated between the rotor and the stator or is connected to a delivery channel of the eccentric screw pump, i.e. to a flow path on the outlet side of the pump. Also, in this configuration it would be possible to provide more than one pressure channel, i.e. several pressure channels. The at least one pressure channel transfers the pressure, i.e. the fluid pressure, produced by the pump inside the pump cavity or on the outlet side of the pump into the pressure chamber to provide an increasing pressure onto the elastic or elastomeric stator portion with increasing pressure produced by the pump. By this a low friction during start of the pump and also a tight contact between stator and rotor during operation under higher pressure can be achieved.

According to a further possible embodiment there may be reinforcement elements arranged inside the pressure chamber, which reinforcement elements preferably extending in a radial direction with respect to the axial direction of the rotor. The reinforcement elements ensure a certain stiffness of the elastomeric stator portion, preferably in the radial direction, in those operational conditions in which a lower or substantially no pressure is acting onto the outside of the elastomeric portion, i.e. inside the pressure chamber. By this configuration it is avoided that the elastomeric stator portion can be deformed in the radial direction due to the pressure acting between the rotor and the stator, i.e. between the rotor and the elastomeric stator portion inside a pump cavity. This ensures a tight contact between the stator, i.e. the elastomeric portion of the stator, and the rotor also in the operational conditions with low pressure produced by the pump, in particular during start of the pump.

Preferably said reinforcement elements extend between the at least one elastomeric stator portion and a surrounding casing. By this the elastomeric stator portion is supported on the casing via the reinforcement elements. Forces acting in the radial direction from the inside onto the elastomeric stator portion are transferred via the reinforcement elements onto the casing. Preferably the reinforcement elements and the casing are configured such that substantially no deformation occurs and the shape of the elastomeric stator portion is maintained, thus, ensuring a tight contact between the elastomeric stator portion and the rotor even in operational conditions in which the pressure inside the pressure chamber is not high enough.

The reinforcing elements for example may be configured as columns or pillows respectively, webs and/or ribs extending from the elastomeric stator portion outwardly, preferably in radial direction.

According to a further preferred embodiment the reinforcement elements may be integrally formed with at least a part of the stator, preferably at least with the elastomeric stator portion and further preferably with the entire stator. The reinforcement elements may be made from the same material as the connected parts of the stator and in particular the elastomeric stator portion. Furthermore, it would be possible to form the reinforcement elements from a different material connected with the other parts of the stator, in particular with the elastomeric portion of the stator. The reinforcement elements for example may be connected to the elastomeric stator portion during a molding process of the elastomeric portion and/or of the reinforcement elements. This may be achieved for example by a multi-component injection molding process.

According to a further possible embodiment the distance between proximate reinforcement elements in a first region of the stator is closer than in at least a second region of the stator, wherein preferably the distance becomes closer towards one axial end of the stator. Furthermore, it would be possible to vary the number of reinforcement elements and/or the stiffness of the reinforcement elements due to their configuration over the axial lengths of the stator, in particular over the axial length of the elastomeric stator portion. For example, there may be arranged more reinforcement elements or reinforcement elements closer to one another in a region of higher pressure of the stator to ensure a required stiffness of the elastomeric stator portion in radial direction.

According to a further preferred embodiment said pressure chamber extends around the stator over the whole periphery. This ensures forces acting on the elastomeric stator portion in radial direction over the entire circumference of the rotor to achieve the tight contact between the stator and the rotor. Furthermore, by this an equal application of forces can be achieved.

According to a further preferred embodiment said pressure chamber in the axial direction extends over a part region or over the complete axial lengths of the stator, wherein the pressure chamber preferably extends over at least 75% of the axial length of the stator. This ensures a high or close contact between the rotor and the stator in substantially the entire contact region between the stator and the rotor.

According to a further possible embodiment the elastomeric stator portion has a varying thickness over its axial extension, wherein the thickness preferably decreases from the suction side to the delivery side of the eccentric screw pump. Such a configuration ensures a higher stiffness of the elastomeric stator portion close to the suction side which is advantageous during start of the pump when the produced pressure acting inside the pressure chamber is low. By the reduced thickness of the elastomeric stator portion towards the delivery or pressure side of the screw pump a higher flexibility of the elastomeric portion is achieved, so that the pressure acting inside the pressure chamber can effect a deformation of the elastomeric portion in the radial direction to press the elastomeric portion onto the outer side of the rotor for an improved or closer contact.

In the following the invention is described by example with reference to the accompanying drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
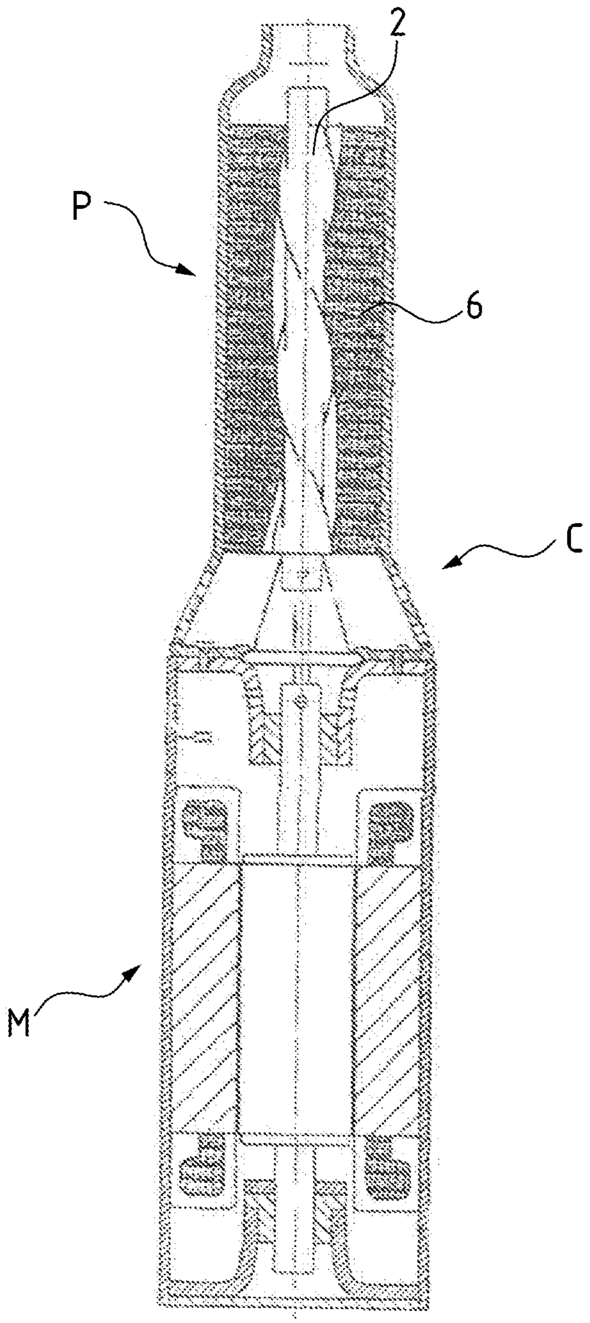
Fig.1 prior art
FIG. 1 is an eccentric screw pump according to the prior art.

Referring to the drawings, FIG. 1 shows an eccentric screw pump device as known in the prior art. The pump device comprises the eccentric screw pump P and an electric drive motor M coupled the pump P via a coupling device C. The coupling device C transfers the rotational movement of the drive motor M onto the rotor 2 of the pump allowing a superimposed radial movement of the rotor 2 to achieve a resulting eccentric movement of the rotor 2 inside a surrounding stator 6. The rotor 2 comprises a helix on its outer circumference and the stator 6 comprises a helix on its inner circumference, wherein in this embodiment the rotor 2 has a double helix and the stator has a single helix. However, this may be arranged vice versa.

Figure 2:
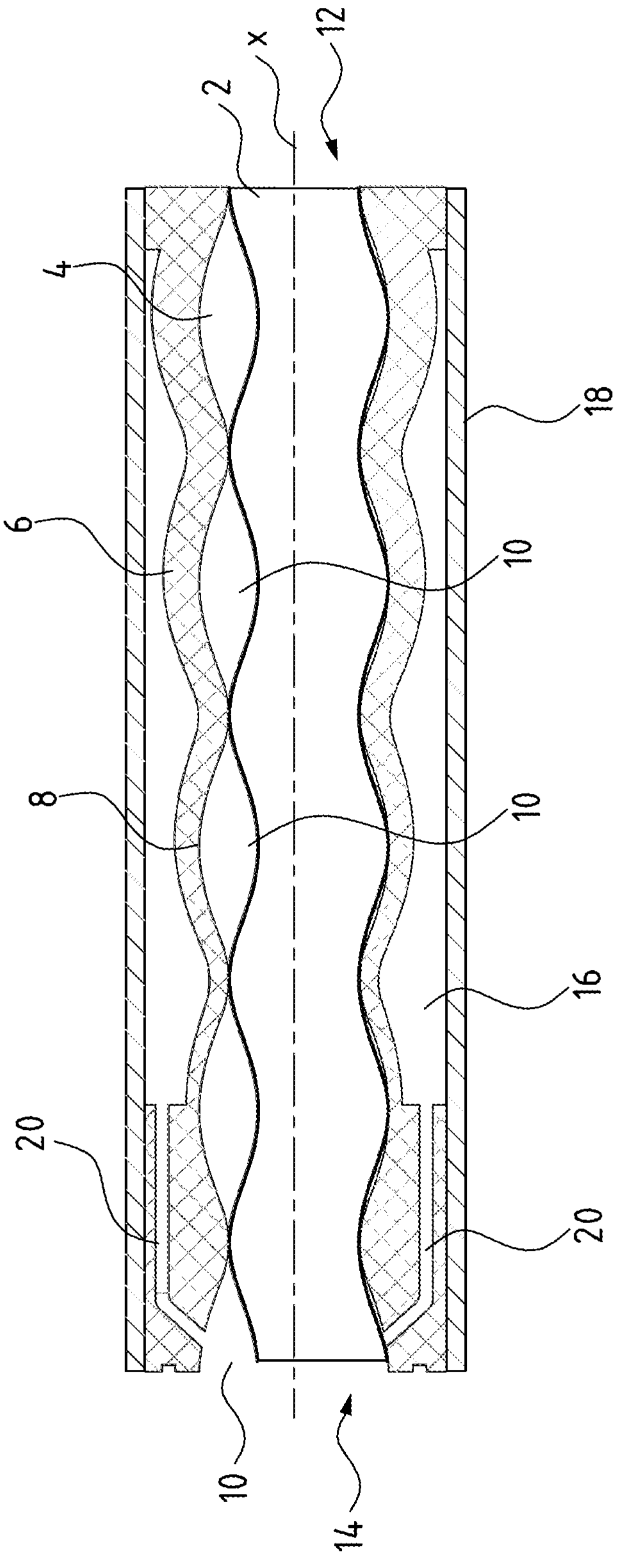
FIG. 2 is a schematic cross sectional view of an eccentric screw pump according to a first embodiment.
Figure 3:
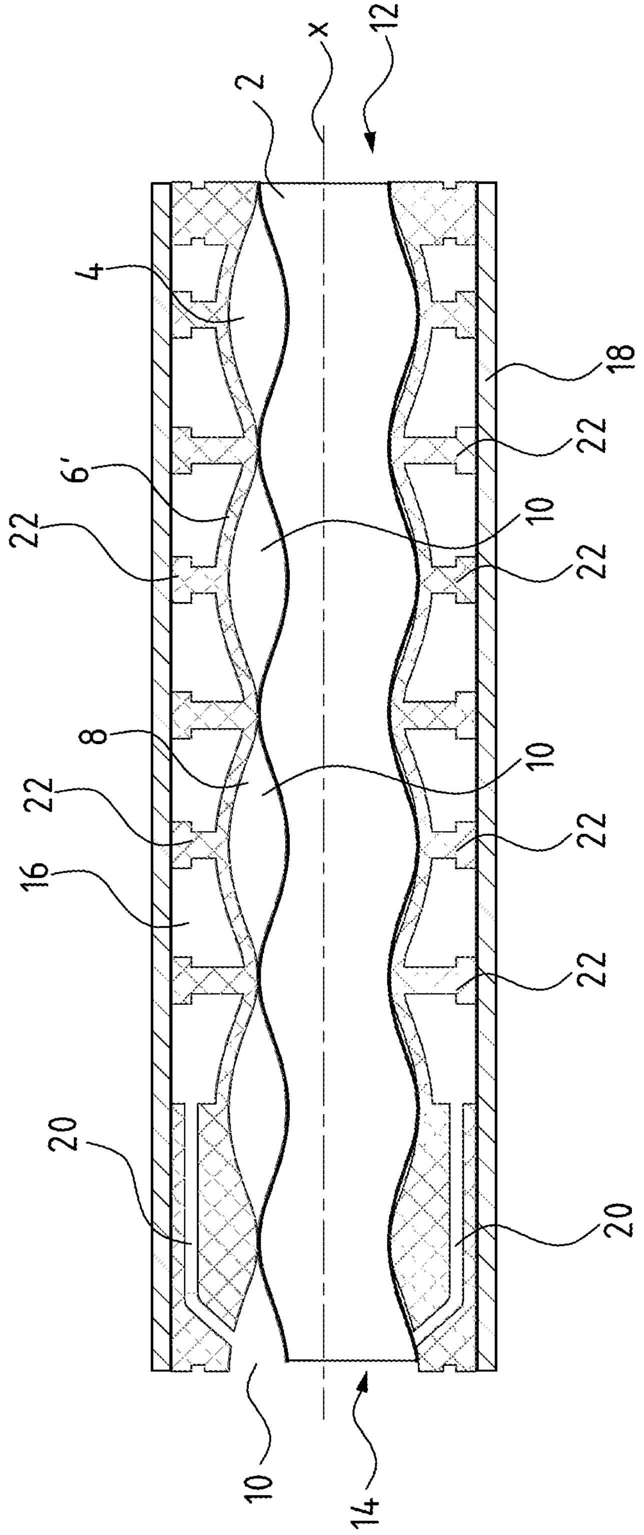
FIG. 3 is a schematic cross sectional view of a helical screw pump according to a second embodiment.

FIGS. 2 and 3 show the eccentric screw pump without the drive. The drive may be a conventional drive motor, in particular an electric motor which is coupled to the rotor 2 in such a way that the rotor 2 fulfils the necessary eccentric motion, i.e. a rotational movement with a superimposed radial movement as it is commonly known for eccentric screw pumps and shown for example in FIG. 1.

The rotor 2 in both embodiments is made from a rigid material, like metal, for example stainless steel. According to the usual configuration of eccentric screw pumps the rotor 2 has a thread or helix 4 on its outside. A surrounding stator 6 in FIGS. 2 and 6' in FIG. 3 is made from an elastic material and encircles the rotor 2. On its inner circumference also the stator 6, 6' has a thread or helix 8 according to the common configuration of eccentric screw pumps. The rotor 2 and the stator 6, 6' are dimensioned such that the protruding portions of the helix 4 on the outer circumference of the rotor 2 come into contact with the protrusions of the helix 8 of the stator 6, 6'. By this pump cavities 10 are formed between the rotor 2 and the surrounding stator 6, 6'.

The shown pump has a suction end 12 and a delivery end 14. The fluid or medium to be pumped enters the pump cavities on the suction end 12 and is feed through the pump towards the delivery end 14 with an increase in pressure.

According to the invention there is provided a pressure chamber 16 surrounding the outside of a middle portion of the stator 6, 6'. The pressure chamber 16 is provided between the outer circumference of the stator 6, 6' and the inner side of a surrounding casing 18. The casing 18 is also made from a rigid material as metal, in particular steel. The pressure chamber 16 is, thus, arranged on an outer side of the stator 6 facing away from the rotor 2, i.e. opposite to the rotor 2. In this example the pressure chamber 16 extends over approximately 75% of the axial lengths of the pump in the axial direction x of the rotor 2. The pressure chamber 16 is connected via pressure channels 20 to the pump cavity 10 between rotor 2 and stator 6, i.e. to the flow path for the fluid to be pumped, near the delivery end 14. In this pressure region on the exit or delivery side of the pump the pumped fluid has an increased pressure, i.e. substantially the delivery pressure of the pump. This pressure is transferred via the pressure channel 20 into the pressure chamber 16. The pressure acting inside the pressure chamber 16 produces a force acting onto the elastomeric stator on the inner circumference of the pressure chamber 16 in radial direction with respect to the longitudinal axis X of the rotor 2. Due to the elasticity of the stator 8 or a respective elastomeric stator portion the protruding portions of the helix 8 formed on the inner circumference of the stator 6, 6' are pressed against the outer circumference, in particular the protruding portions of the helix 4 of the rotor 2. This ensures a close or sealing contact between rotor 2 and stator 6, 6' sealing the pump cavities 10 and ensuring higher efficiency and functionality of the pump even under higher pressure. However, when starting the pump there is nearly no exit or delivery pressure in the cavity 10 on the delivery end 14 and, thus, there is also no increased pressure inside the pressure chamber 16. By this the radial force acting on the stator 6, 6' or an elastomeric stator portion, respectively, is reduced which reduces the friction between stator 6, 6' and rotor 2 during start of the pump.

To ensure a sufficient stiffness of the stator 6, in particular during starting operation, when there is no increased pressure inside the pressure chamber 16, according to the first embodiment in FIG. 2 the stator 6 has a wall thickness increasing towards the suction end 12 of the pump. The thickness of the wall of the stator 6 decreases from the suction end 12 towards the delivery end 14 along the longitudinal extension of the pressure chamber 16. This ensures a higher stiffness on the inlet or suction end of the stator 6 which is advantageous when starting the pump. Towards the delivery end 14 the thickness of the wall of the stator 6 is reduced such that the flexibility is increased. This ensures a high flexibility of the wall of the stator 6 in the region of higher pressure so that during operation of the pump in particular in this region the stator wall by the pressure acting inside the pressure chamber 16 is pressed towards the outer circumference of the rotor 2.

FIG. 3 shows a different solution for supporting the wall of the stator 6' or an elastomeric stator portion, respectively. In this embodiment the wall of the stator 6' along the pressure chamber 16 has a constant thickness. However, inside the pressure chamber 16 there are arranged reinforcement elements 22 extending in radial direction between the inner wall of the stator 6' and the surrounding casing 18. By this the stator 6' is supported on the casing 18 via the reinforcement elements 22. The reinforcement elements 22 in this embodiment are integrally formed with the entire stator 6'. However, it would also be possible to configure the reinforcement elements 22 as separate elements. In this embodiment the reinforcement elements 22 are formed as ribs extending in radial or circumferential direction perpendicular to the longitudinal axis X. Alternatively, it would be possible that the reinforcement elements 22 are shaped as posts or pillars extending between the stator 6' and the inner wall of the casing 18. In either case the reinforcement elements 22 should be configured such that they allow a pressure exchange between the cavities or portions between the reinforcement elements 22 inside the pressure chamber 16 so that a uniform pressure can be ensured inside the pressure chamber 16 over the entire circumference and the entire longitudinal extension of the pressure chamber 16.

While specific embodiments of the invention have been shown and described in detail to illustrate the application of the principles of the invention, it will be understood that the invention may be embodied otherwise without departing from such principles.

REFERENCE CHARACTERS

2 rotor
4 helix
6, 6' stator, elastomeric stator portion
8 helix
10 pump cavity
12 suction end
14 delivery end
16 pressure chamber
18 casing
20 pressure channels
22 reinforcement elements
x axial direction/longitudinal axis

The invention claimed is:

1. An eccentric screw pump comprising:
a rotor; and
a stator surrounding the rotor, the stator comprising at least one elastomeric stator portion in contact with the rotor and a pressure chamber formed on a radial outer side of said elastomeric stator portion, the radial outer side facing away from said rotor, wherein said pressure chamber is connected to a pressure region of the eccentric screw pump such that the at least one elastomeric stator portion is subjected to a pressure produced by the eccentric screw pump, the pressure chamber being connected to a pressure region of a delivery end of the pump via at least one pressure channel, the at least one pressure channel being arranged inside a casing of the stator, wherein the pressure in the pressure chamber is greater than the pressure on a radial inner side of the at least one elastomeric stator portion, the at least one elastomeric stator portion comprising elastomeric material, the pressure channel being formed inside the elastomeric material of the elastomeric stator portion, wherein the pressure channel has a cross section that is less than a cross section of the pressure chamber.

2. An eccentric screw pump according to claim 1, wherein said pressure chamber is connected to the pressure region in the flow path for the fluid pumped by the pump, wherein the pressure chamber is connected to said pressure region via the at least one pressure channel.

3. An eccentric screw pump according to claim 1, wherein the stator is arranged in a casing and the pressure chamber is formed between the casing and the at least one elastomeric stator portion.

4. An eccentric screw pump according to claim 1, wherein the rotor is formed of a material with a lower elasticity than the elastomeric stator portion.

5. An eccentric screw pump according to claim 1, wherein the pressure chamber is connected to the pressure region via the at least one pressure channel comprising valve means positioned and configured to vary the cross section of the pressure channel.

6. An eccentric screw pump according to claim 1, wherein the pressure chamber is connected to the pressure region via the at least one pressure channel connected to a pump cavity between the rotor and the stator or connected to a delivery channel of the eccentric screw pump.

7. An eccentric screw pump according to claim 1, further comprising reinforcement elements arranged in the pressure chamber.

8. An eccentric screw pump according to claim 7, wherein the reinforcement elements extend in a radial direction with respect to the axial direction of the rotor.

9. An eccentric screw pump according to claim 7, wherein the reinforcement elements extend between the at least one elastomeric stator portion and a surrounding casing.

10. An eccentric screw pump according to claim 7, wherein the reinforcement elements are integrally formed with the stator.

11. An eccentric screw pump according to claim 7, wherein a distance between two proximate reinforcement elements in a first region of the stator is closer than in at least a second region of the stator.

12. An eccentric screw pump according to claim 1, wherein the pressure chamber extends around the stator over a whole periphery thereof.

13. An eccentric screw pump according to claim 1, wherein the pressure chamber extends in the axial direction over a part region or over the complete axial length of the stator.

14. An eccentric screw pump according to claim 1, wherein the elastomeric stator portion of the stator has a varying thickness over an axial extension thereof.

15. An eccentric screw pump according to claim 1, wherein the pressure chamber extends over at least 75% of an axial length of the stator.

16. An eccentric screw pump according to claim 1, further comprising:

a casing, the radial outer side of the stator and an inner surface of the casing defining at least a portion of the pressure chamber.

17. An eccentric screw pump according to claim 16, wherein the radial outer side comprises a plurality of undulating portions, each of the undulating portions being located at a spaced location from the inner surface of the casing.

18. An eccentric screw pump according to claim 17, wherein the radial outer side comprises a radial outer side surface at a suction end of the eccentric screw pump, the radial outer side surface extending in an axial direction of the casing, the radial outer side surface being in contact with a portion of the inner surface of the casing.

19. An eccentric screw pump comprising:

a rotor; and a stator surrounding the rotor, the stator comprising at least one elastomeric stator portion and a pressure chamber formed on a radial outer side of said elastomeric stator portion, the radial outer side facing away from said rotor, wherein said pressure chamber is connected to a pressure region of the eccentric screw pump such that the at least one elastomeric stator portion is subjected to a pressure produced by the eccentric screw pump, wherein the elastomeric stator portion of the stator has a varying thickness over an axial extension thereof, wherein a flexibility of the elastomeric stator portion at a delivery end of the eccentric screw pump is greater than a flexibility of the elastomeric stator portion at a suction end of the eccentric screw pump, the pressure in the pressure chamber being greater than the pressure on a radial inner side of the at least one elastomeric stator portion, the at least one elastomeric stator portion comprising elastomeric material, the pressure channel being formed in the elastomeric material of the elastomeric stator portion, wherein the pressure channel has a cross section that is less than a cross section of the pressure chamber.

20. An eccentric screw pump comprising:

a rotor; and a stator surrounding the rotor, the stator comprising at least one elastomeric stator portion in contact with the rotor and a pressure chamber formed on a radial outer side of said elastomeric stator portion, the radial outer side facing away from said rotor, wherein said pressure chamber is connected to a pressure region of the eccentric screw pump such that the at least one elastomeric stator portion is subjected to a pressure produced by the eccentric screw pump, wherein the pressure in the pressure chamber is greater than the pressure on a radial inner side of the at least one elastomeric stator portion, the pressure chamber being connected to the pressure region in the flow path for the fluid pumped by the pump, the pressure chamber being connected to the pressure region via at least one pressure channel, the stator being arranged in a casing and the pressure chamber being formed between the casing and the at least one elastomeric stator portion, the at least one elastomeric stator portion comprising elastomeric material, the elastomeric material of the elastomeric stator portion defining the pressure channel, wherein the pressure channel has a pressure channel cross section, the pressure chamber having a pressure chamber cross section, wherein the pressure channel cross section is less than the pressure chamber cross section.

* * * * *